(12) United States Patent
Yap et al.

(10) Patent No.: US 11,308,994 B2
(45) Date of Patent: Apr. 19, 2022

(54) TOP COVER SPRING DESIGNS

(71) Applicant: Seagate Technology LLC, Fremont, CA (US)

(72) Inventors: Pow Ming Yap, Singapore (SG); Tai Zen Tan, Singapore (SG); Siew Ming Ng, Singapore (SG); Hui Khim Cho, Melaka (MY); Swee How Alvin Teo, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/852,904

(22) Filed: Apr. 20, 2020

(65) Prior Publication Data

US 2021/0327473 A1    Oct. 21, 2021

(51) Int. Cl.
| | | |
|---|---|---|
| *G11B 33/08* | (2006.01) | |
| *F16F 1/32* | (2006.01) | |
| *B21D 22/02* | (2006.01) | |
| *F16F 15/06* | (2006.01) | |
| *F16F 3/02* | (2006.01) | |
| *G11B 33/02* | (2006.01) | |
| *G11B 33/12* | (2006.01) | |

(52) U.S. Cl.
CPC .............. *G11B 33/08* (2013.01); *B21D 22/02* (2013.01); *F16F 1/328* (2013.01); *F16F 3/02* (2013.01); *F16F 15/06* (2013.01); *G11B 33/02* (2013.01); *G11B 33/027* (2013.01); *G11B 33/121* (2013.01)

(58) Field of Classification Search
None
See application file for complete search history.

(56) References Cited

U.S. PATENT DOCUMENTS

| | | | | |
|---|---|---|---|---|
| 5,636,091 | A * | 6/1997 | Asano | G11B 5/5521 360/264.3 |
| 6,347,023 | B1 * | 2/2002 | Suwa | G11B 25/043 360/264.8 |
| 6,407,879 | B1 | 6/2002 | Fruge' et al. | |
| 6,466,398 | B1 * | 10/2002 | Butler | G11B 25/043 360/99.18 |
| 6,498,700 | B2 | 12/2002 | Takahashi et al. | |
| 6,603,633 | B2 * | 8/2003 | Heaton | G11B 5/4806 360/264.3 |
| 6,697,213 | B2 * | 2/2004 | Lofstrom | G11B 33/08 360/97.19 |
| 6,724,566 | B2 * | 4/2004 | Kant | G11B 33/08 360/99.16 |
| 6,928,842 | B1 * | 8/2005 | Huang | E05B 37/0034 70/21 |
| 6,950,275 | B1 | 9/2005 | Ali et al. | |
| 7,031,104 | B1 * | 4/2006 | Butt | G11B 5/6005 360/97.13 |
| 7,256,960 | B2 * | 8/2007 | Cho | G11B 33/08 360/97.19 |

(Continued)

*Primary Examiner* — Jefferson A Evans
(74) *Attorney, Agent, or Firm* — Faegre Drinker Biddle & Reath LLP

(57) ABSTRACT

A hard disk drive includes a base, a cover coupled to the base to create an enclosure, and a voice coil motor assembly that is positioned within the enclosure. The cover includes a spring positioned adjacent to the voice coil motor assembly to dampen vibration of the voice coil motor assembly.

19 Claims, 10 Drawing Sheets

(56) References Cited

U.S. PATENT DOCUMENTS

| | | | | |
|---|---|---|---|---|
| 7,262,939 B2* | 8/2007 | Hatchett | | G11B 25/043 360/264.3 |
| 7,292,406 B1* | 11/2007 | Huang | | G11B 33/08 360/97.19 |
| 7,529,062 B2* | 5/2009 | Xu | | G11B 25/043 360/97.19 |
| 8,553,356 B1* | 10/2013 | Heo | | G11B 25/043 360/99.18 |
| 10,373,651 B2 | 8/2019 | Sato | | |
| 10,373,652 B2 | 8/2019 | Yap et al. | | |
| 2002/0135945 A1* | 9/2002 | Heaton | | G11B 5/4806 360/264.7 |
| 2002/0196581 A1* | 12/2002 | Tsang | | G11B 5/60 360/97.15 |
| 2003/0165032 A1* | 9/2003 | Miyamoto | | G11B 5/5569 360/264.1 |
| 2003/0227710 A1* | 12/2003 | Hong | | G11B 5/486 360/99.18 |
| 2005/0168866 A1 | 8/2005 | Cho | | |
| 2005/0286223 A1* | 12/2005 | Morales | | H05K 7/20145 361/690 |
| 2006/0023347 A1* | 2/2006 | Hatchett | | G11B 33/121 360/99.13 |
| 2007/0103857 A1* | 5/2007 | Weech | | G06F 1/184 361/679.34 |
| 2013/0155603 A1* | 6/2013 | Kaneko | | G11B 25/043 361/679.33 |
| 2015/0176670 A1* | 6/2015 | Laszlo | | F16C 23/08 267/165 |
| 2016/0111814 A1* | 4/2016 | Hirano | | G11B 33/122 361/679.33 |
| 2018/0263104 A1* | 9/2018 | Hamada | | H04N 5/2253 |
| 2019/0069844 A1* | 3/2019 | Nassim | | H02G 3/121 |
| 2020/0096190 A1* | 3/2020 | Huprich | | F21V 23/023 |

* cited by examiner

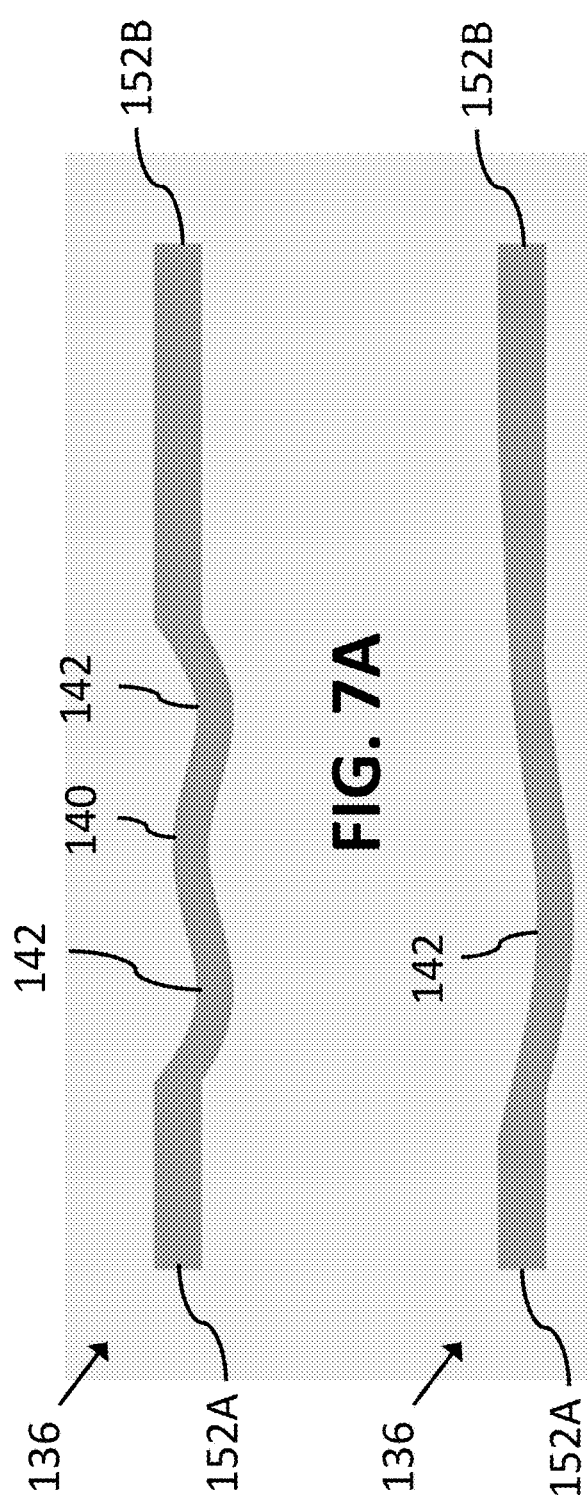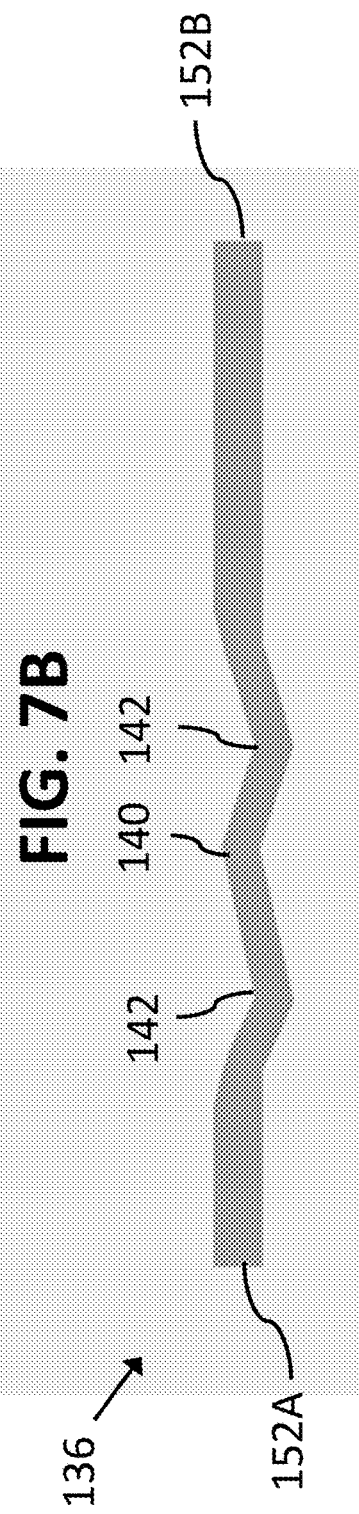

TOP COVER SPRING DESIGNS

SUMMARY

In certain embodiments, a hard disk drive includes a base, a cover coupled to the base to create an enclosure, and a voice coil motor assembly (VCMA) positioned within the enclosure. The cover includes a spring positioned adjacent to the VCMA to dampen vibration of the VCMA.

In certain embodiments, a cover for a hard disk drive includes a main body extending along a plane and between a top surface and a bottom surface. The cover further includes a plurality of springs protruding from the main body and each extending from the main body at both a first end and a second end of the respective springs.

In certain embodiments, method for making a cover for a hard disk drive is disclosed. The cover includes a main body portion and a spring portion. The method includes stamping a first set of openings in the cover to create fastener openings in the main body portion, stamping a second set of openings in the cover to create openings between springs of the spring portion, and stamping the springs to create a spring profile.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIGS. 7A-C show side profiles of springs, in accordance with certain embodiments of the present disclosure.

Figure 1:
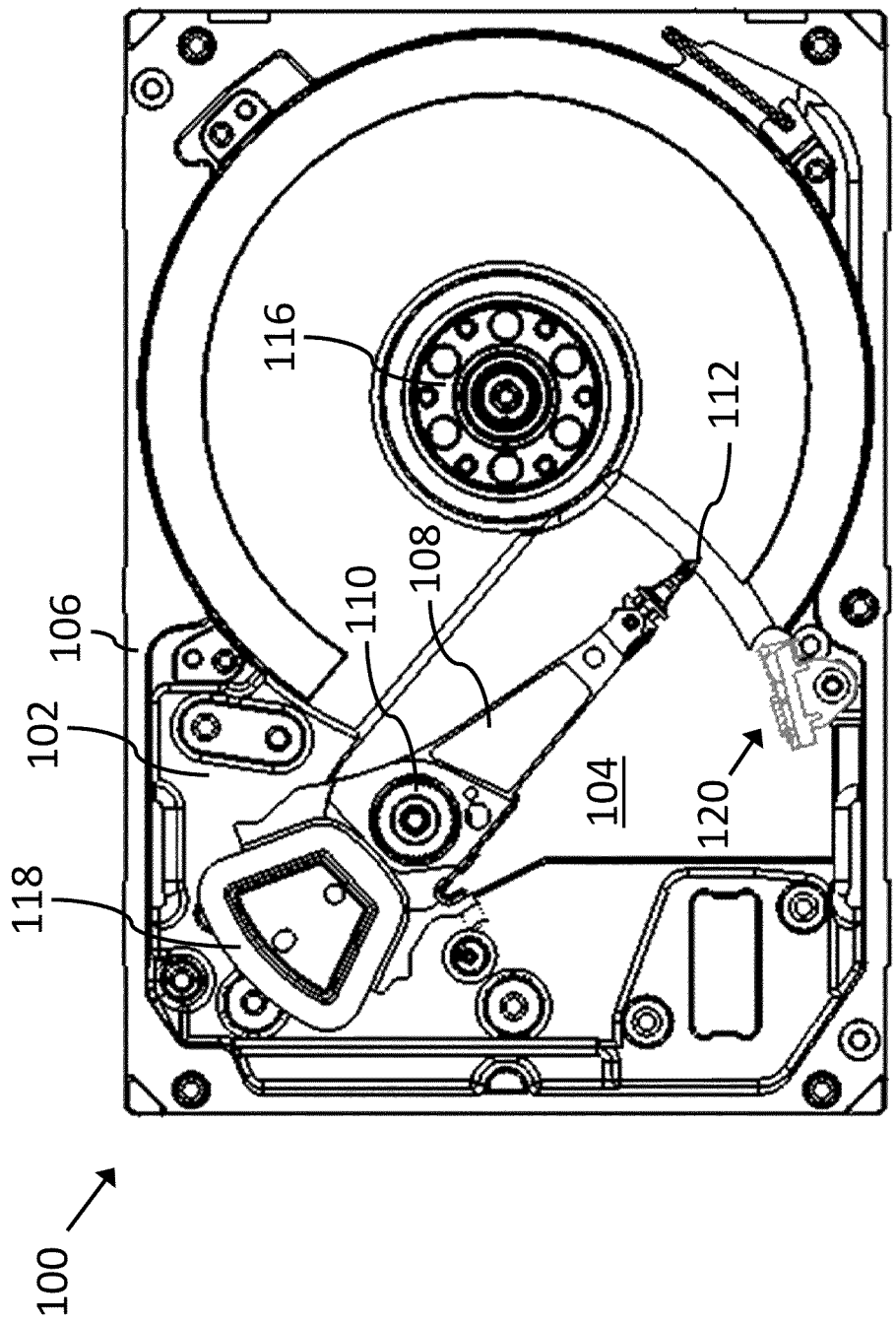
FIG. 1 shows a top view of portions of a hard disk drive, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

Hard disk drives include voice coil motors that use reactive magnetic forces to rotate an actuator assembly. These reactive forces can induce vibrations as the voice coil motors operate and cause errors when reading data from and writing data to magnetic recording media. Further, these reactive forces can directly or indirectly cause local deformation of the hard disk drives' covers and cause leaks between the covers and base decks. Certain embodiments of the present disclosure are accordingly directed to dampening forces from voice coil motors.

FIG. 1 shows a hard disk drive 100 including a base deck 102. The base deck 102 includes a base member or a floor 104 with side walls 106 that form an internal cavity in which various hard disk drive components are positioned. As shown in FIG. 1, the side walls 106 extend around a periphery of the floor 104. When the hard disk drive 100 is assembled, a cover (as will be shown in other Figures and described in more detail below) is coupled to the base deck 102 to enclose the hard disk drive components within the internal cavity.

Figure 2:
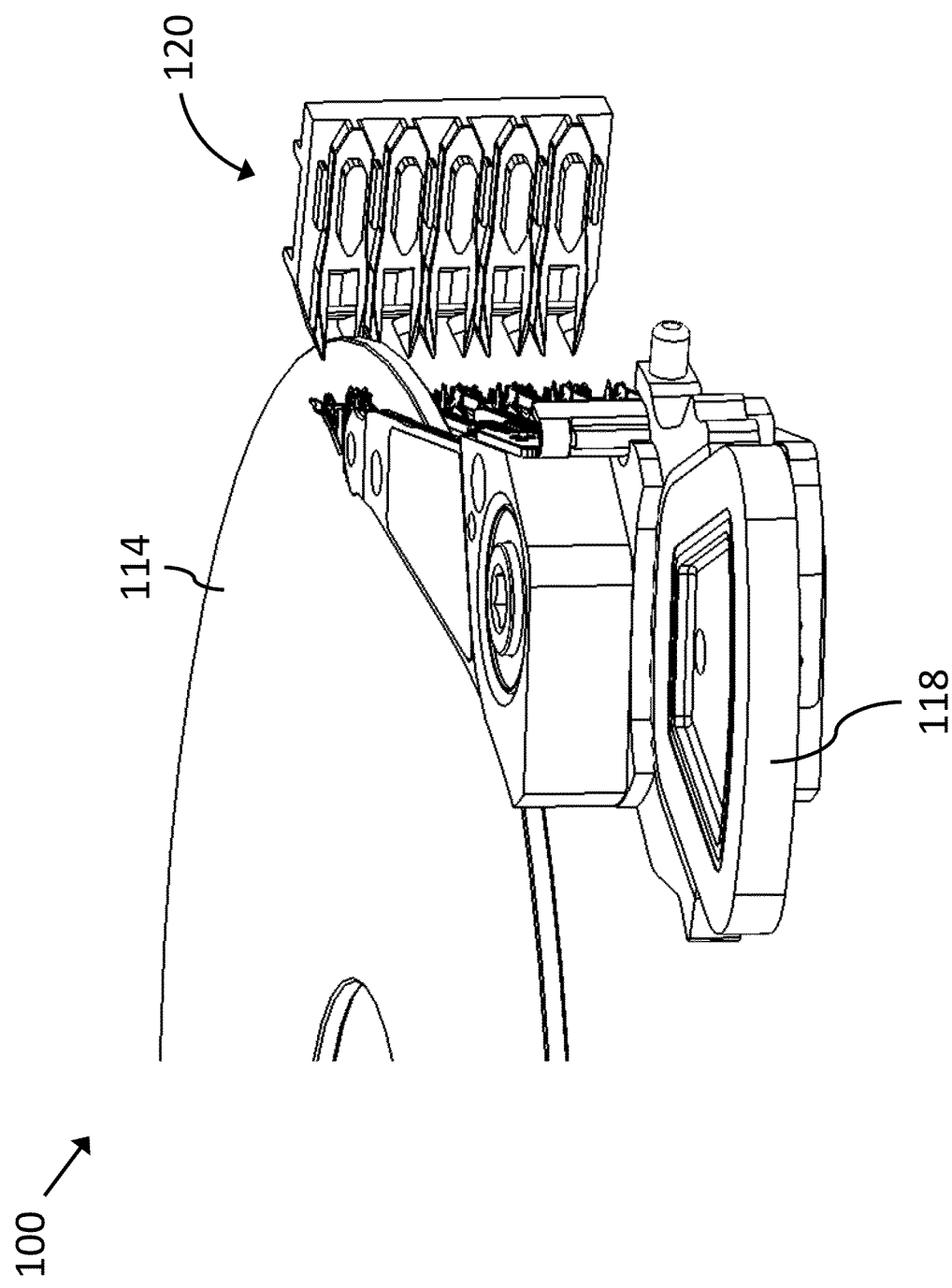
FIG. 2 shows a perspective view of components of the hard disk drive of FIG. 1, in accordance with certain embodiments of the present disclosure.

FIG. 1 shows the hard disk drive 100 with an actuator assembly 108, which can rotate around a pivot bearing 110. The actuator assembly 108 positions sliders each with read/write heads 112 over data tracks on rotating magnetic recording media 114 (as shown in FIG. 2). During operation, a spindle motor 116 rotates the magnetic recording 114 media while the actuator assembly 108 is driven by a voice coil motor assembly (as will be shown in other Figures and described in more detail below). A coil 118 is coupled to the actuator assembly 108 and is part of the voice coil motor assembly (hereinafter referred to as the "VCMA"). The actuator assembly 108 pivots around the pivot bearing 110. The read/write heads 112 write data to the magnetic recording media 114 by generating and emitting a magnetic field towards the magnetic recording media 114 which induces magnetically polarized transitions on the desired data track on the magnetic recording media 114. The magnetically polarized transitions are representative of the data. The read/write heads 112 sense (or "read") the magnetically polarized transitions with a magnetic transducer. As the magnetic recording media 114 rotates adjacent the read/write heads 112, the magnetically polarized transitions induce a varying magnetic field into a magnetic transducer of the read/write heads 112. The magnetic transducer converts the varying magnetic field into a read signal that is delivered to a preamplifier and then to a read channel for processing to be used by a host system (e.g., server, laptop computer, desktop computer). When the read/write heads 112 are not positioned over the magnetic recording media 114, lift tabs positioned at the distal ends of the actuator assembly 108 can rest on a load/unload ramp 120. FIG. 2 shows the actuator assembly 108 in a position with the read/write heads 112 positioned over the magnetic recording media 114.

Figure 3:
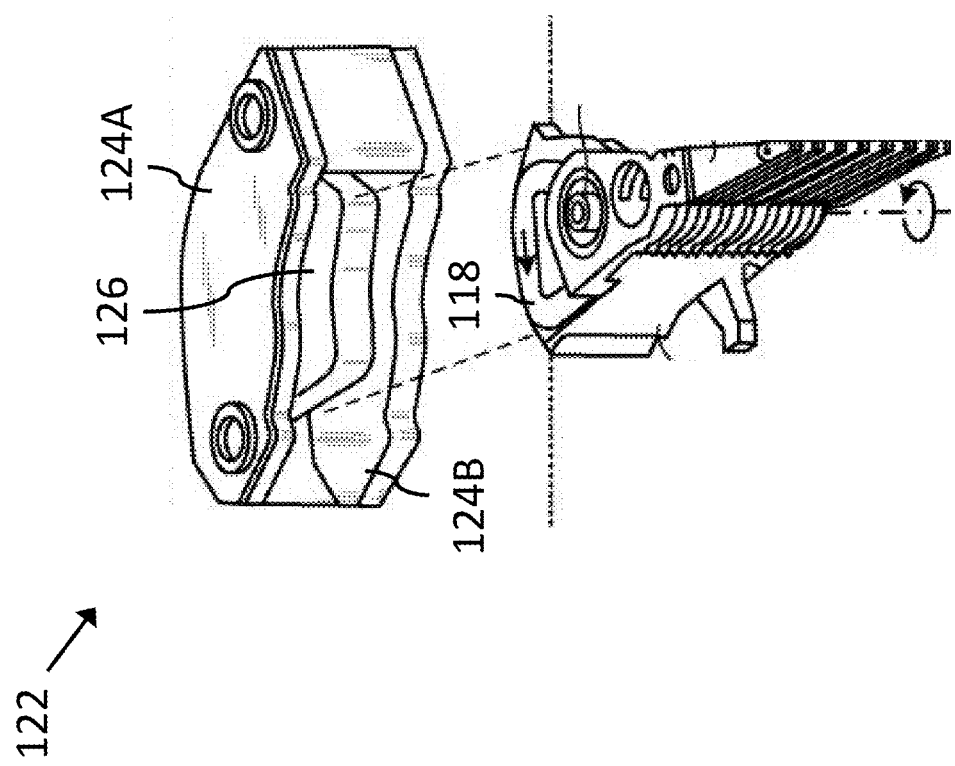
FIG. 3 shows a perspective view of a voice coil motor assembly of the hard disk drive of FIG. 1, in accordance with certain embodiments of the present disclosure.

FIG. 3 shows various features of the VCMA 122, which includes a top pole assembly 124A and a bottom pole assembly 124B. Both the top pole assembly 124A and the bottom pole assembly 124B can be coupled to respective permanent magnets 126 (only one of which is shown in FIG. 3). When the hard disk drive 100 is assembled, the coil 118 can be at least partially positioned between the top pole assembly 124A and the bottom pole assembly 124B. During operation of the hard disk drive 100, a servo control system controls rotation of the actuator assembly 108 via the VCMA 122 to position the read/write heads 112 over a desired track on the magnetic recording media 114 for reading and writing operations. For example, the servo control system controls an amount of current applied to the coil 118 which creates a magnetic field that interacts with the magnetic fields of the permanent magnets on the top pole assembly 124A and the bottom pole assembly 124B. As noted above, these magnetic forces can induce vibration and cause the read/write heads 112 to be knocked off-track.

Figure 4:
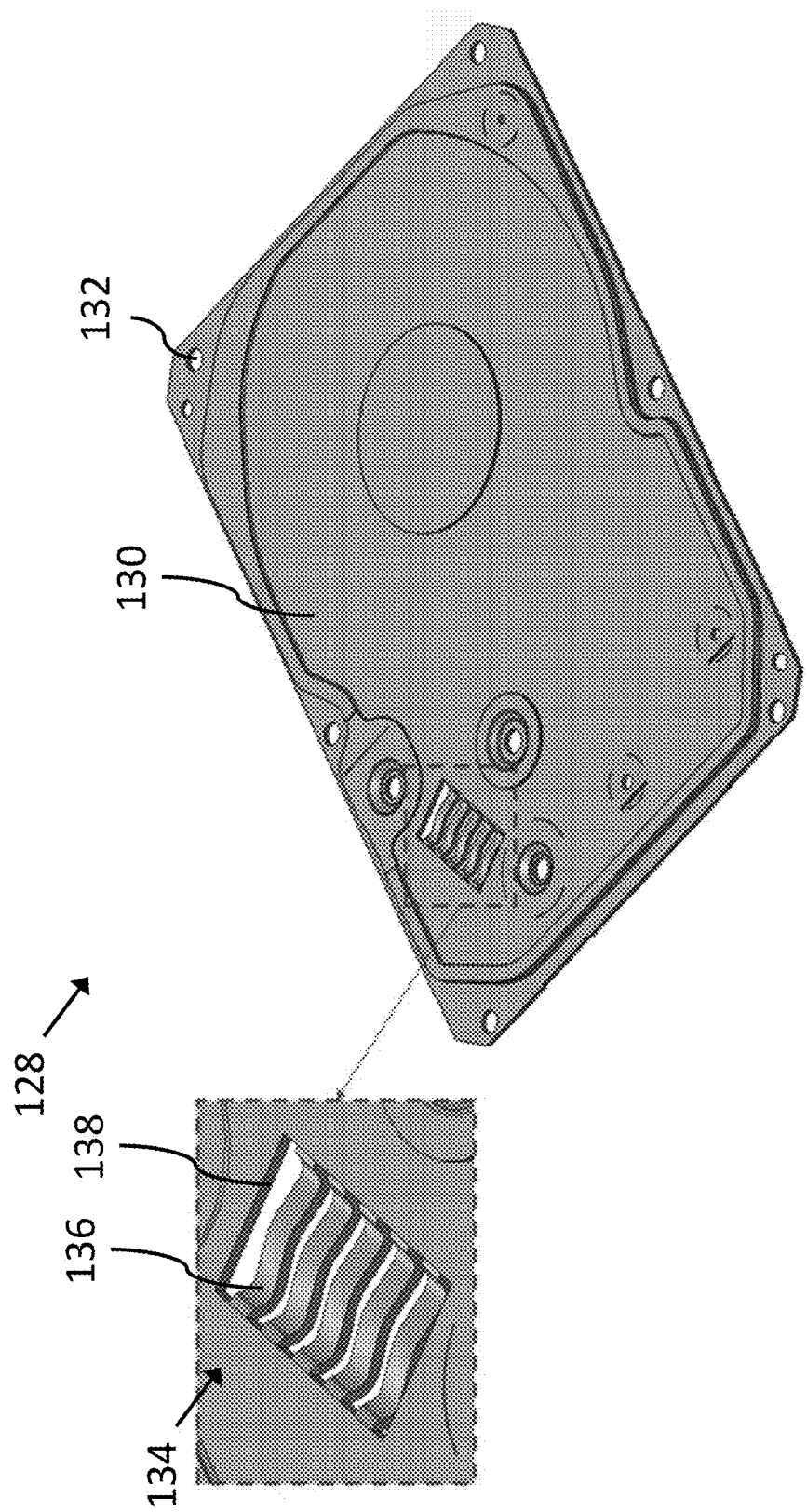
FIG. 4 shows a perspective view of a cover for the hard disk drive of FIG. 1, in accordance with certain embodiments of the present disclosure.
Figure 5:
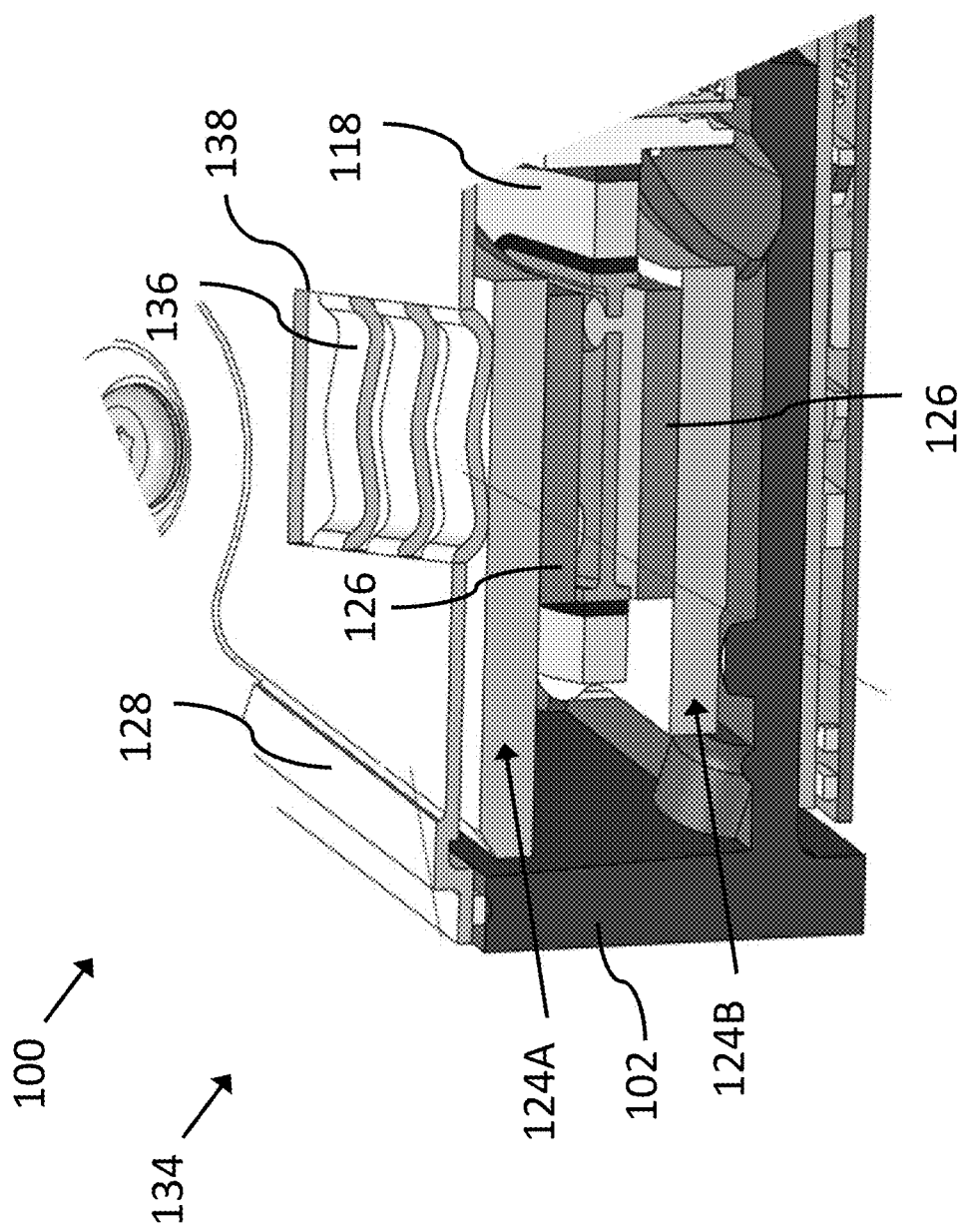
FIGS. 5 and 6 show cutaway side views of components of the hard disk drive of FIG. 1, in accordance with certain embodiments of the present disclosure.

FIG. 4 shows one example of the cover 128, and FIG. 5 shows the cover 128 coupled to the base deck 102 to create an enclosure in which various data storage components are positioned. The cover 128 includes a main body portion 130 that extends along a plane and that has various openings therethrough. For example, the main body portion 130 can include fastener openings 132 (as shown in FIG. 4) for receiving fasteners (e.g., screws) that help couple the cover 128 to the base deck 102.

The cover 128 also includes a spring portion 134 that includes one or more springs 136 (e.g., resilient members). The spring portion 134 is positioned adjacent to the VCMA 122. Left undampened, reactive forces from the VCMA 122 can induce vibrations. The springs 136 are positioned adjacent to the VCMA 122 to dampen vibration created by the VCMA 122. For example, when the reactive forces of the VCMA 122 press against the springs 136, the springs 136 deform but the main body portion 130 deforms less than the spring portion 134. Put another way, with the springs 136, the cover 128 experiences local deformation at the spring portion 134 but limited deformation of the rest of the cover 128 in response to the reactive forces of the VCMA 122. As shown in FIG. 5, one or more portions of the springs 136 can contact—and be biased against—portions of the top pole assembly 124A of the VCMA 122. The springs 136 can apply a spring force (e.g., a spring force along a vertical direction) onto the VCMA 122.

As shown in the inset in FIG. 4, the springs 136 are positioned in an opening 138 (e.g., a rectangular opening) in the main body portion 130. The springs 136 extend in the opening 138 between different parts of the main body portion 130. Put another way, both ends of each of the springs 136 extend from the main body portion 130. Further, the spring portion 134 can include individual openings between each of the springs 136 such that the springs 136 can deform independently of each other.

Figure 6:
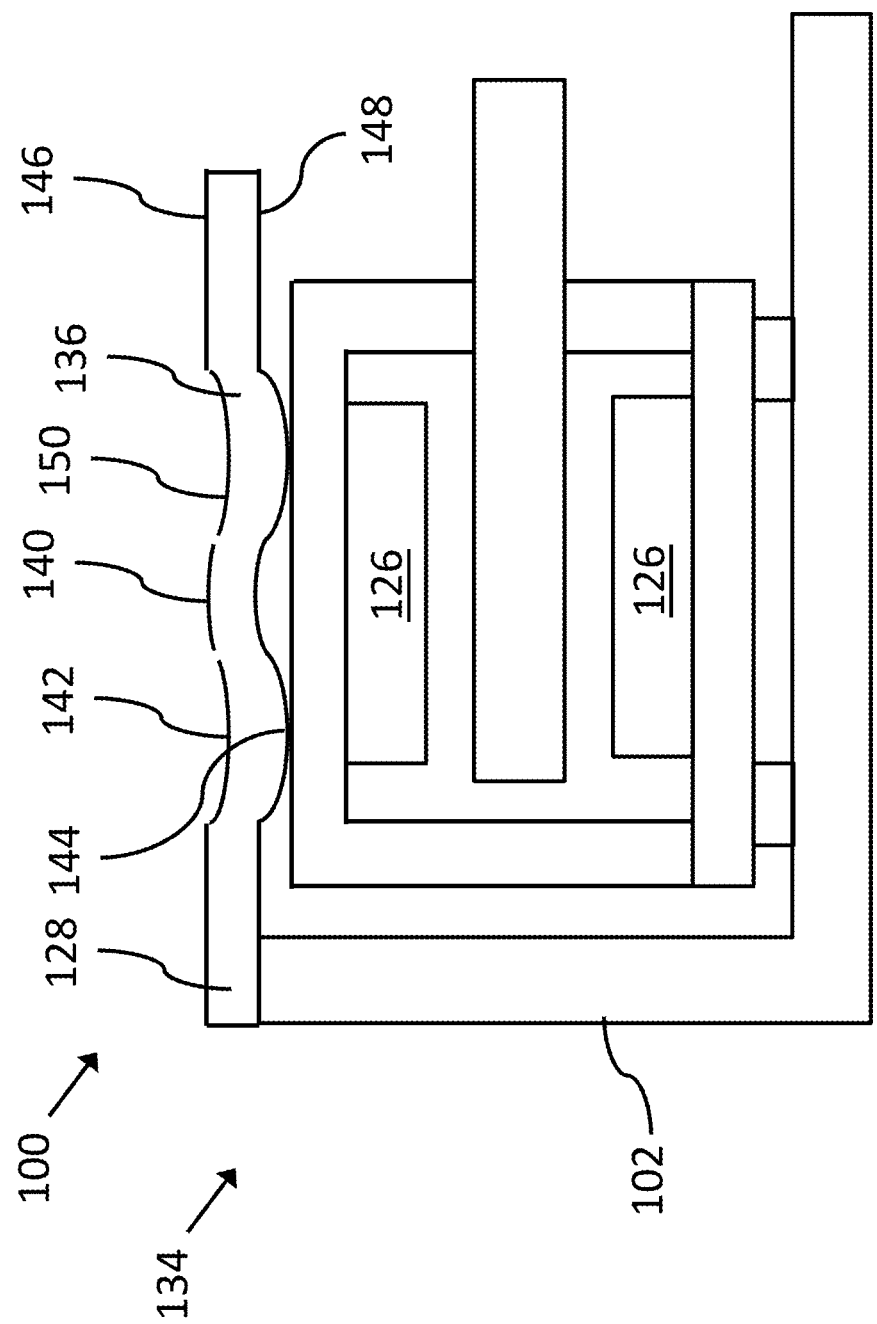

FIG. 6 shows a cutaway view of the hard disk drive 100. As shown in FIG. 6, the spring 136 can have a wave-like (e.g., wavy) profile. For example, like a wave, the spring 136 can include one or more crests 140 and troughs 142. In FIG. 6, a bottom surface 144 of the springs 136 at the troughs 142 is the portion of the springs 136 that contacts the top pole assembly 124A of the VCMA 122. The springs 136 can be considered to protrude from the main body portion 130. Put another way, the main body portion 130 can be generally flat and can extend along a plane while at least portions of the springs 136 (e.g., the troughs 142) can protrude from the main body portion 130 towards the interior of the hard disk drive 100.

In certain embodiments, the thickness of the springs 136 is less than a thickness of the main body portion 130 (e.g., the distance between a top surface 146 and a bottom surface 148 of the main body portion 130) of the cover 128. The thickness of the springs 136 will affect the amount of spring force provided by the springs 136. Thinner springs 136 will deform more compared to thicker springs 136.

In certain embodiments, the springs 136 have a top surface 150 that is positioned at a height that is lower than the top surface 146. For example, the entire top surface 150 of the springs 136 (including the top surface of the springs 136 at the crest 140) can be positioned below the top surface 150 of the cover 128. With the springs 136 (or a portion thereof) being positioned below the top surface 146 of the cover 128, the springs 136 (or the portion thereof) are less likely to breach the standardized overall outer dimensions of the hard disk drive 100. Further, as will be described in more detail below, a label can be placed over the spring portion 134 to provide a seal over the spring portion 134.

FIGS. 7A-C show various exemplary side profiles of the springs 136. As the springs 136 extend between ends 152A and 152B, the springs 136 can include one or more crests 140 and troughs 142. Having multiple troughs 142 (and therefore contact points with the VCMA 122) allows for a more even distribution of the spring force provided by the springs 136 compared to springs 136 with a single trough 142. Further, the top pole assembly 124A of the VCMA 122 may be less likely to tilt with multiple troughs 142 or contact points. If the top pole assembly 124A of the VCMA 122 is tilted, the various magnetic forces of the VCMA 122 can be applied unevenly because the spacing between the magnet of the top pole assembly 124A and the coil 118 will be uneven or out of specification. FIGS. 7A and 7C show example profiles of springs 136 with multiple contact points, and FIG. 7B shows an example profile with a single but wider contact point.

Figure 8:
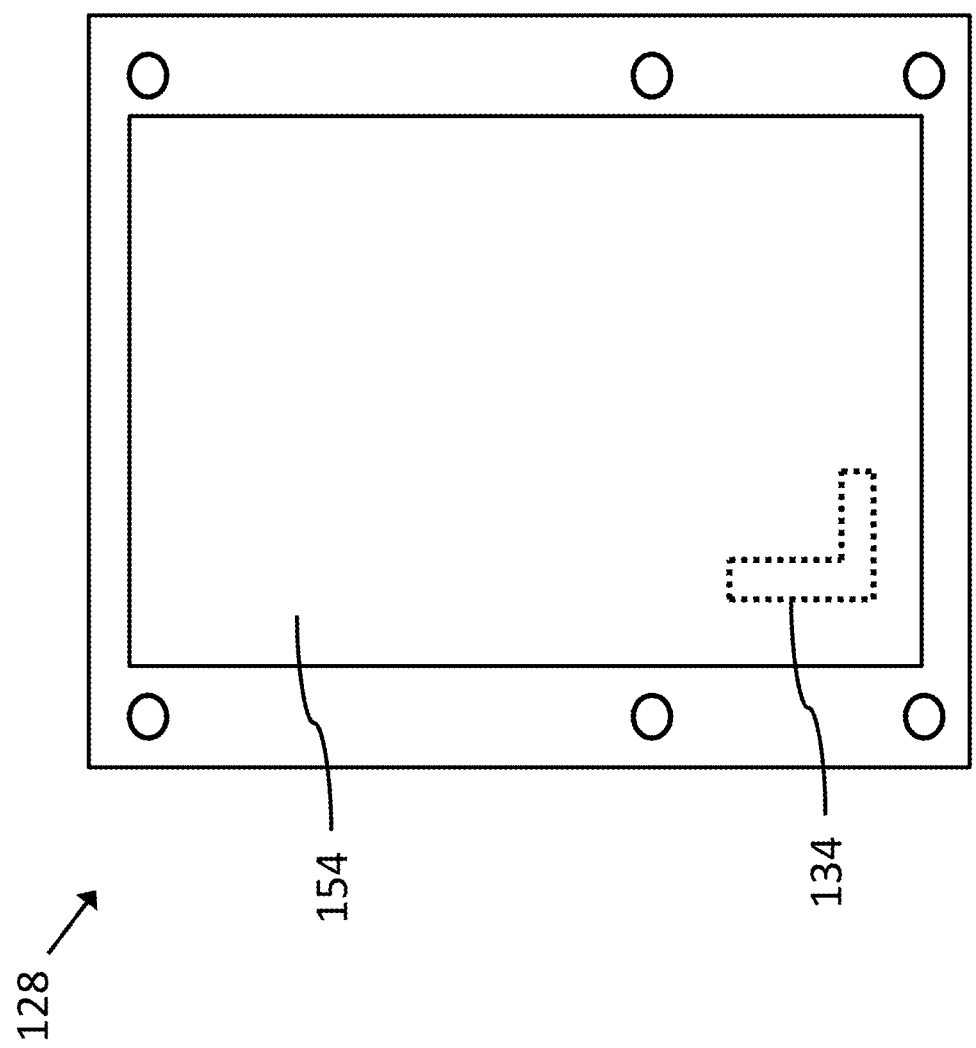
FIG. 8 shows a top view of a cover for the hard disk drive of FIG. 1, in accordance with certain embodiments of the present disclosure.

FIG. 8 shows a top view of the cover 128 with an attached label 154 covering the spring portion 134 (and therefore the springs 136) of the cover 128. The spring portion 134 includes openings between the individual springs 136, so the label 154 can cover the openings so that air and particles cannot enter the interior of the hard disk drive 100 through the openings. The label 154 can include printed information such as product details (e.g., serial number, model number, bar codes).

The label 154 can include an adhesive backing to adhere the label 154 to the cover 128. In certain embodiments, the label 154 does not include an adhesive backing at or around the spring portion 134 (shown in dotted lines in FIG. 8). This approach can reduce the risk of the adhesive itself introducing a contaminant (e.g., via outgassing) into the interior of the hard disk drive 100 through the openings in the spring portion 134. Further, this approach can help prevent the label 154 from sticking to the springs 136 themselves. The label 154 can seal the openings without necessarily requiring a separate filter assembly to filter air at the openings between the springs 136.

In certain embodiments, the label 154 includes a metallic layer to further improve the sealing ability of the label 154. Additionally or alternatively, a layer of a dampening material can directly or indirectly cover the spring portion 134. For example, a layer of dampening material can be positioned external to the hard disk drive 100 to help reduce the effects of acoustic-based vibration.

Figure 9:
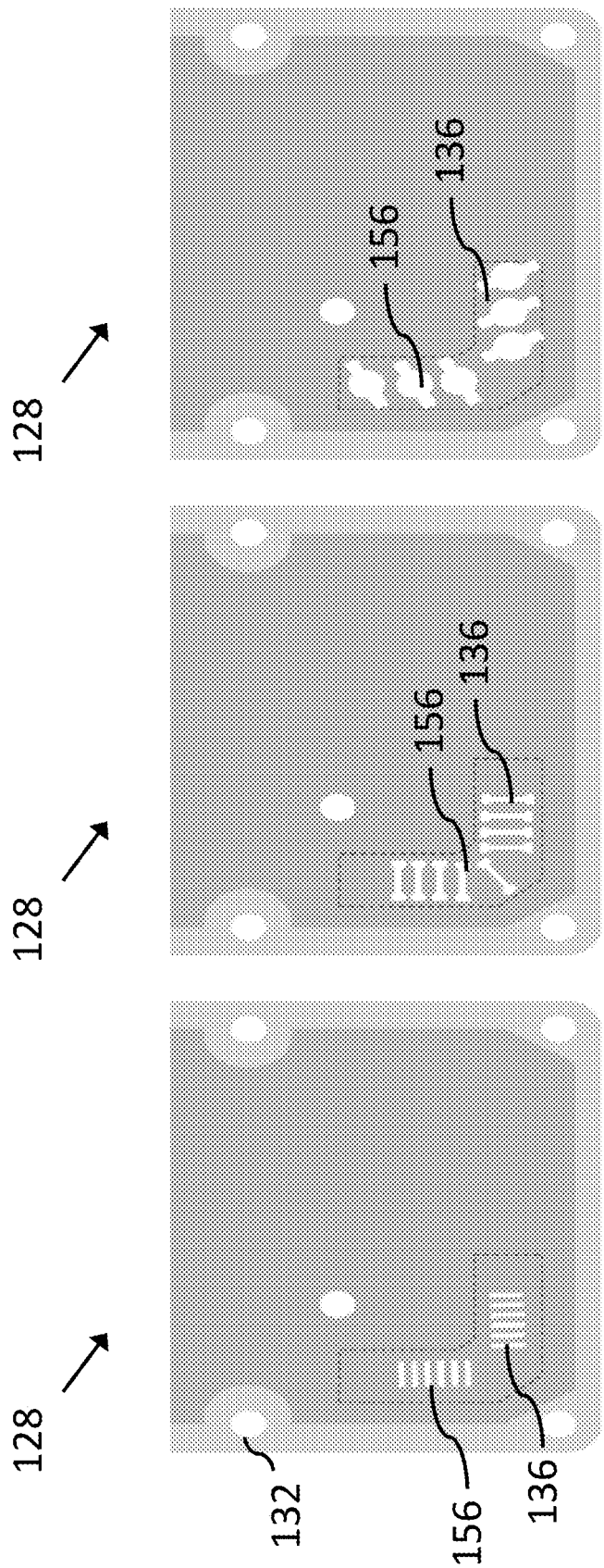
FIGS. 9A-C show top views of portions of a cover for the hard disk drive of FIG. 1, in accordance with certain embodiments of the present disclosure.

FIGS. 9A-C show portions of the cover 128 with different exemplary arrangements of the springs 136. As shown in these figures, the springs 136 can be arranged in one or more rows of springs 136. In certain embodiments, the rows of springs 136 extend perpendicular to each other. For example, the rows of springs 136 can reflect the general L-shape of the top pole assembly 124A.

As shown in FIGS. 9A-C, the number of springs 136 included in the cover 128 can vary. In some embodiments, the spring portion 134 of the cover 128 includes 2-10 individual springs 136 with openings 156 positioned between each of the adjacent springs 136. As also seen in FIGS. 9A-C, the shapes of the springs 136 can vary. For example, the springs 136 shown in FIG. 9A have straight uniform widths whereas most of the springs 136 in FIGS. 9B and 9C are uniform with respect to each other but the widths vary as the springs 136 extend lengthwise.

The various features of the cover 128 can be created by machining, stamping, and the like. With stamping, tooling can be used to create the various openings in the cover 128. For example, the tooling can create the fastener openings 132 around the outer perimeter of the cover 128. The tooling can also create the openings between the springs 136. In certain embodiments, the fastener openings 132 and the opening between the springs 136 can be created at the same time.

Additionally or alternatively, one or more coining processes can be used to create the shape and desired thicknesses of the springs 136. For example, to create the springs 136 with a smaller thickness than the main body portion 130 of the cover 128, thicker tooling at the spring portion 134 can be used when stamping features into the cover 128.

Figure 10:
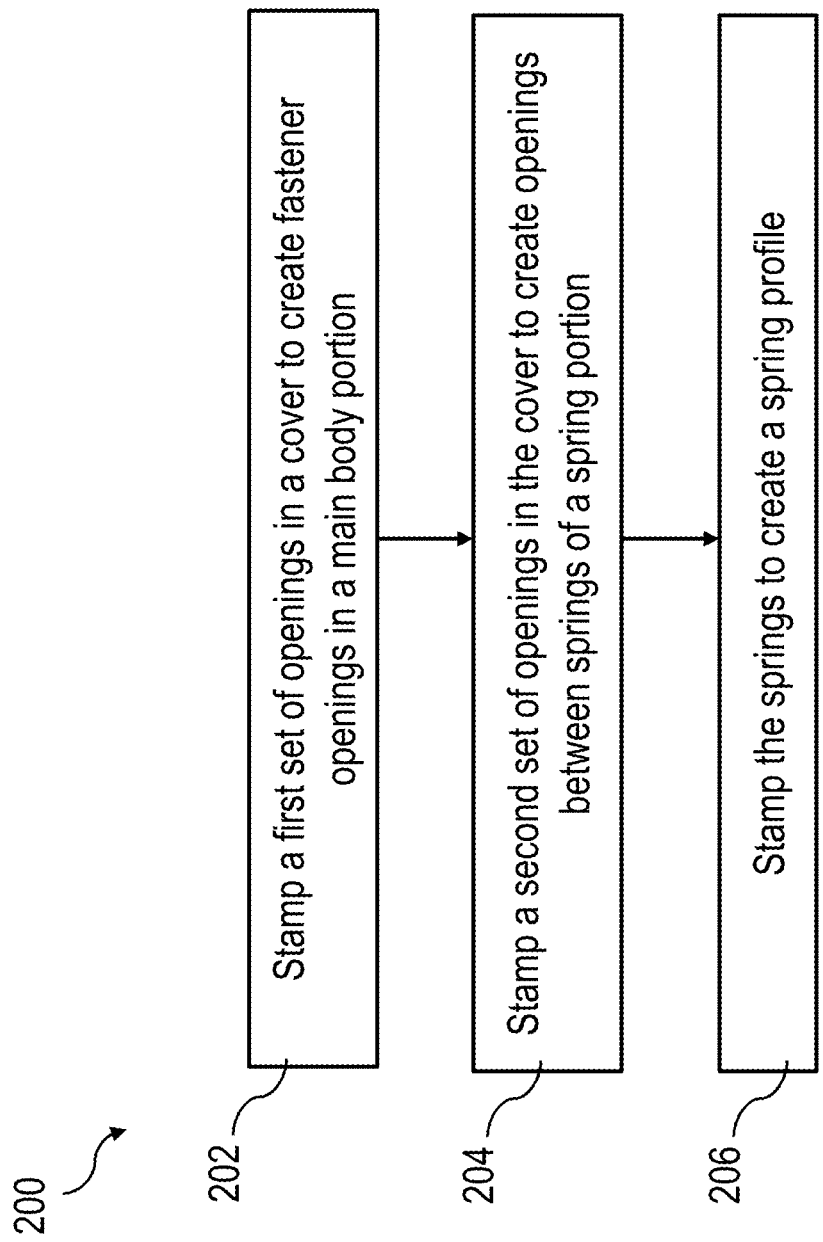
FIG. 10 shows a block diagram of a method for making the covers of FIGS. 4, 8, and 9A-C, in accordance with certain embodiments of the present disclosure.

FIG. 10 shows a block representation of steps of a method 200 for creating the cover 128 for the hard disk drive 100. The method 200 includes stamping a first set of openings in the cover 128 to create the fastener openings 132 in the main body portion 130 of the hard disk drive 100 (block 202 in FIG. 10). The method 200 further includes stamping a second set of openings in the cover 128 to create openings between the springs 136 of the spring portion 134 of the cover 128 (block 204 in FIG. 10). The method 200 further includes stamping the springs 136 to create a spring profile (e.g., a wave-like profile with one or more crests 140 and troughs 142) (block 206 in FIG. 10). Two or more steps described above can be carried out simultaneously or serially. Further, the steps can be ordered differently than presented above.

The stamped cover 128 can be coupled to the base deck 102 of the hard disk drive 100 by fasteners. The label 154 can be adhered to the cover 128 to cover the openings of the spring portion 134.

Although the springs 136 described above and shown in the Figures are positioned to dampen reactive forces of the top pole assembly 124A of the VCMA 122, similar structures can be used for the bottom pole assembly 124B in the base deck 102 or of a separate component coupled to the base deck 102.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A hard disk drive comprising:
   a base;
   a cover coupled to the base to create an enclosure;
   a voice coil motor assembly (VCMA) positioned within the enclosure, the cover including a spring positioned adjacent to the VCMA to dampen vibration of the VCMA, the cover including openings adjacent to the spring; and
   a label adhered to the cover and arranged to cover the spring and the openings to seal the enclosure.

2. The hard disk drive of claim 1, wherein at least a portion of the spring contacts at least a portion of the VCMA.

3. The hard disk drive of claim 2, wherein the spring contacts a top pole of the VCMA.

4. The hard disk drive of claim 2, wherein the spring has multiple contact points with the VCMA.

5. The hard disk drive of claim 1, wherein the spring provides a spring force on the VCMA.

6. The hard disk drive of claim 1, wherein the spring has a wavy profile.

7. The hard disk drive of claim 1, wherein the spring has a thickness that is less than a thickness of another portion of the cover.

8. The hard disk drive of claim 1, wherein the spring has a top surface that is positioned at a height that is different than a top surface of the cover.

9. The hard disk drive of claim 1, wherein the cover includes a plurality of springs positioned adjacent the VCMA to dampen resonance of the VCMA.

10. The hard disk drive of claim 9, wherein the plurality of springs are arranged in a row.

11. The hard disk drive of claim 10, wherein the row extends in a direction that is not parallel to an edge of the cover.

12. The hard disk drive of claim 9, wherein the plurality of springs includes 2-10 individual springs.

13. The hard disk drive of claim 9, wherein each of the plurality of springs has only two contact points with the VCMA.

14. The hard disk drive of claim 1, wherein the label includes an adhesive layer, wherein the adhesive layer does not extend along an area where the spring is located.

15. A cover for a hard disk drive, the cover comprising:
   a main body of the cover extending along a plane and between a top surface and a bottom surface;
   a plurality of springs protruding from the main body and each extending from the main body at both a first end and a second end of the respective springs, each of the plurality of springs having a wavy profile;
   at least one opening adjacent to each of the plurality of springs; and
   a plurality of fastener openings along outer portions of the main body.

16. The cover of claim 15, wherein a thickness of the plurality of springs is equal to or less than a thickness of the main body.

17. The cover of claim 15, wherein the plurality of springs are arranged in a row.

18. The cover of claim 17, wherein the row extends in a direction that is not parallel to an edge of the cover.

19. The cover of claim 15, wherein each of the plurality of springs have two troughs and one crest.

* * * * *